United States Patent
Winkler et al.

(10) Patent No.: US 7,628,327 B2
(45) Date of Patent: Dec. 8, 2009

(54) SHUTTERING SYSTEM FOR SCANNING PROJECTORS

(75) Inventors: Bret D. Winkler, South Jordan, UT (US); Forrest L. Williams, Sandy, UT (US)

(73) Assignee: Evans & Sutherland Computer Corporation, Salt Lake City, UT (US)

( * ) Notice: Subject to any disclaimer, the term of this patent is extended or adjusted under 35 U.S.C. 154(b) by 672 days.

(21) Appl. No.: 11/089,644

(22) Filed: Mar. 24, 2005

(65) Prior Publication Data

US 2005/0242185 A1 Nov. 3, 2005

Related U.S. Application Data

(60) Provisional application No. 60/556,783, filed on Mar. 26, 2004.

(51) Int. Cl.
*G06K 7/10* (2006.01)

(52) U.S. Cl. .................................................. 235/454
(58) Field of Classification Search ............... 235/492, 235/454
See application file for complete search history.

(56) References Cited

U.S. PATENT DOCUMENTS

| | | | | |
|---|---|---|---|---|
| 4,571,627 A | * | 2/1986 | Stempeck | 348/333.09 |
| 6,457,834 B1 | * | 10/2002 | Cotton et al. | 353/122 |
| 6,480,634 B1 | * | 11/2002 | Corrigan | 385/4 |
| 6,650,354 B2 | * | 11/2003 | Morizono et al. | 347/255 |

* cited by examiner

*Primary Examiner*—Daniel A Hess
(74) *Attorney, Agent, or Firm*—Thorpe North & Western LLP

(57) ABSTRACT

A shuttering system for a scanning projector having a laser source, a grating light valve light modulator, and a light steering scanner includes a feedback system interconnecting the scanner with the light modulator. The feedback system is configured to deactivate the light modulator in case of scanner malfunction, so as to redirect laser light away from the scanner.

19 Claims, 2 Drawing Sheets

SHUTTERING SYSTEM FOR SCANNING PROJECTORS

PRIORITY CLAIM

This application claims priority from U.S. Provisional patent application Ser. No. 60/556,783, filed on Mar. 26, 2004.

BACKGROUND OF THE INVENTION

1. Field of the Invention

The present invention relates generally to scanning projection systems. More particularly, the present invention relates to an electronic shuttering system for a scanning projector system.

2. Related Art

There are a variety of visual projection systems and methods that use lasers to scan an image onto a projection screen. One of these methods involves scanning a linear array to form an image using a grating light valve (GLV) to project a linear array on a screen. A GLV projection system can be used to produce an image on a flat screen, or can be used to produce a panoramic image on a curved screen.

One challenge presented by laser scanning projection systems is the potential danger of laser light. It is well known that eye damage can occur if laser light (above a certain level) remains on an individual's retina beyond a certain amount of time. Where a scanning system is continuously scanning a laser across a large display area to produce an image, the laser energy is diffused, and thus may not present a hazard if it contacts an individual's retina while the scanning system is operating. However, if the scanning device malfunctions and stops, allowing a single stationary concentrated beam of light to leave the projector, this could be very damaging if the beam contacts the individual's eye. Human reaction time to intense light is usually on the order of about ¼ second. That is, it normally takes a person about ¼ second to blink or look away when intense light strikes the eye. However, laser light can easily damage the eye in far less time.

To prevent eye damage, there are a variety of laser safety systems that have been developed. Many of these comprise mechanical shutter or mirror systems that are configured to shutter or deflect a light source in case of a malfunction of a scanning projector. Some of these systems employ micromechanical optical switches, which move in response to electronic signals to reorient a very small mirror to redirect laser light. Unfortunately, mechanical shutters, even micromechanical ones, lack the speed needed to block laser light fast enough to eliminate all possibility of hazard in case of slow down or stoppage of a scanning laser system. Consequently, many mechanical shutter systems that are known only apply to conventional projector light sources (i.e. light produced from a bulb), and not laser light.

Light-steering devices are also known. However, prior systems known in the art do not provide a satisfactory method of stopping or controlling laser light from causing eye damage.

SUMMARY OF THE INVENTION

It has been recognized that it would be advantageous to develop a laser shutter system for a scanning laser projector that prevents laser light from potentially contacting an individual's eye long enough to cause damage if the scanning device stops or drops below speed.

It has also been recognized that it would be advantageous to develop a laser shutter system that is significantly faster than mechanical shutter systems.

The invention advantageously provides a shuttering system for a scanning projector having a laser source, a grating light valve light modulator, and a light steering scanner. The shuttering system comprises a feedback system interconnecting the scanner with the light modulator, configured to deactivate the light modulator, so as to redirect laser light away from the scanner in case of scanner malfunction.

In accordance with another more detailed aspect of the invention, the shuttering system can be configured to detect scanner malfunction and deactivate the light valve in a time less than 20 microseconds.

In accordance with another aspect thereof, the invention provides a method for rapidly preventing escape of laser light from a scanning laser projection system having a grating light valve light modulator and a scanning device. The method includes the steps of monitoring operation of the scanning device, and deactivating the light modulator upon detection of scanner malfunction.

Additional features and advantages of the invention will be apparent from the detailed description which follows, taken in conjunction with the accompanying drawings, which together illustrate, by way of example, features of the invention.

DETAILED DESCRIPTION

Figure 1:
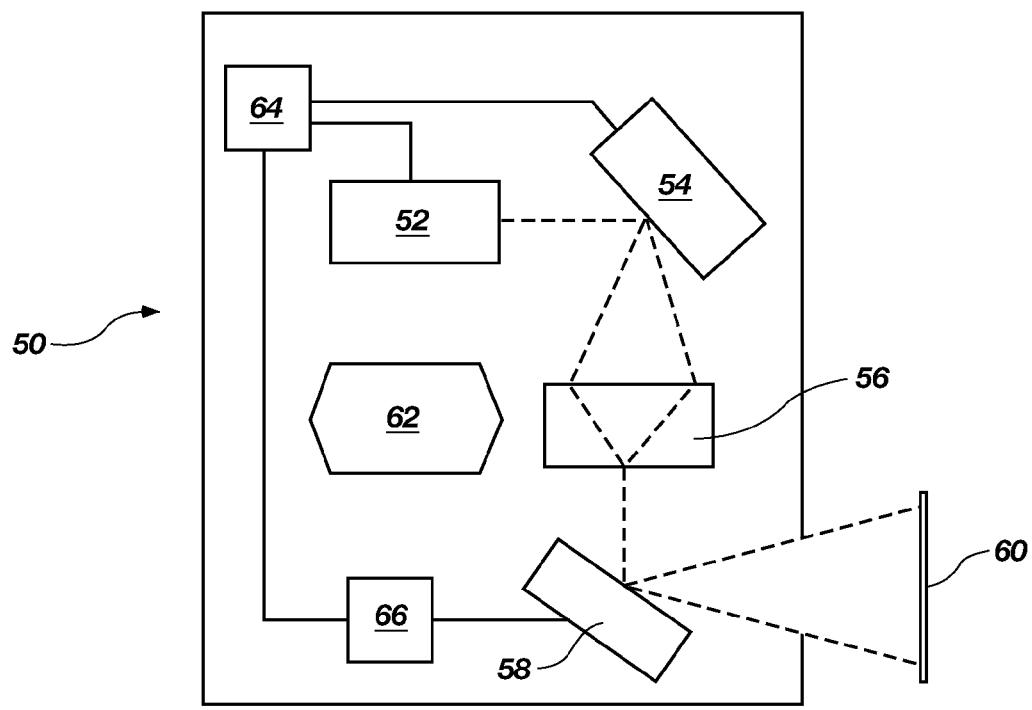
FIG. 1 is a schematic diagram of a scanning laser projection system in accordance with the present invention during normal operation.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

The invention provides a laser shuttering system that is configured to quickly and substantially reduce the amount of laser light exiting a laser projector. In response to possible system failure, the invention reduces the amount of time concentrated laser light could have in contact with the human eye, thus allowing a reduction in laser safety classification. Those skilled in the art will recognize that laser devices are governed by U.S. Food and Drug Administration regulations, as well as International Electrotechnical Commission (IEC) standards for eye safety. Under IEC standards, laser devices with a classification of 3B or higher require special precautions (e.g., special eyewear that prevents viewing of the laser light, variances issued on a per-use basis, etc.) before sale or use, and can require specific licenses for each use. Such requirements are onerous and impractical for devices such as simulator projectors, etc.

Advantageously, the present invention provides a safety system that allows a reduction in the laser safety classification for a projector system. The invention utilizes both system failure detection and a light-steering device to quickly reduce laser light in case of system malfunction, thus preventing possible eye damage to persons in the vicinity of the device. The invention is used in a scanning laser projection system, such as a GLV projection system.

Figure 3:
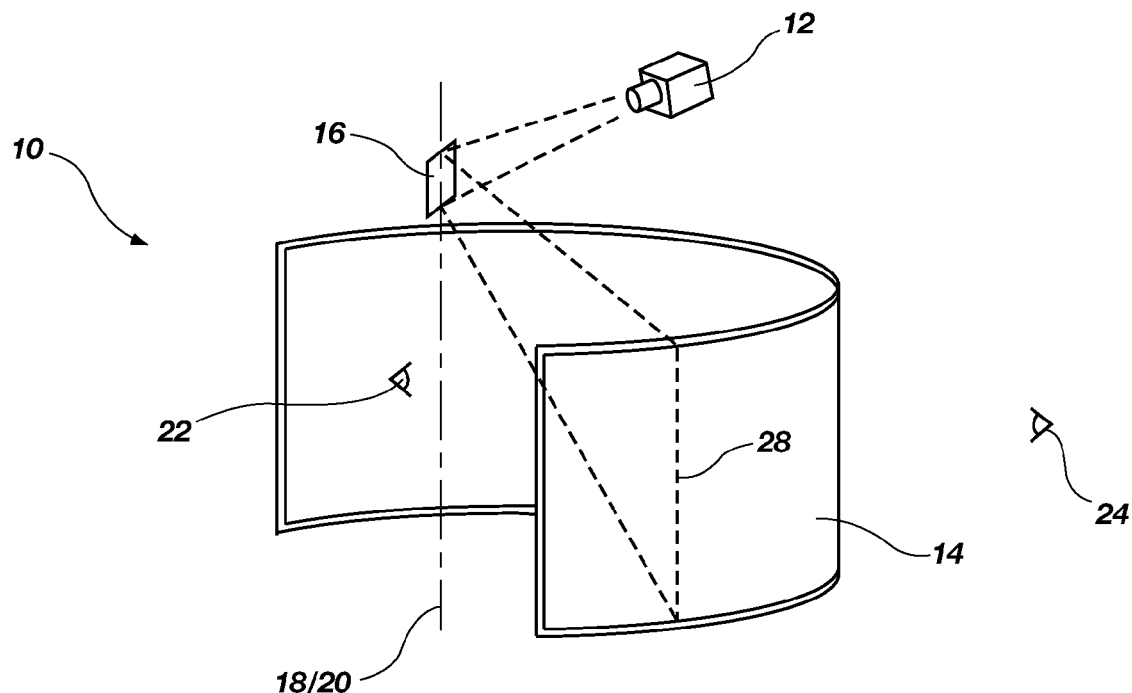
FIG. 3 is a perspective view of a wide angle laser scanner using a GLV projection system.
Figure 4:
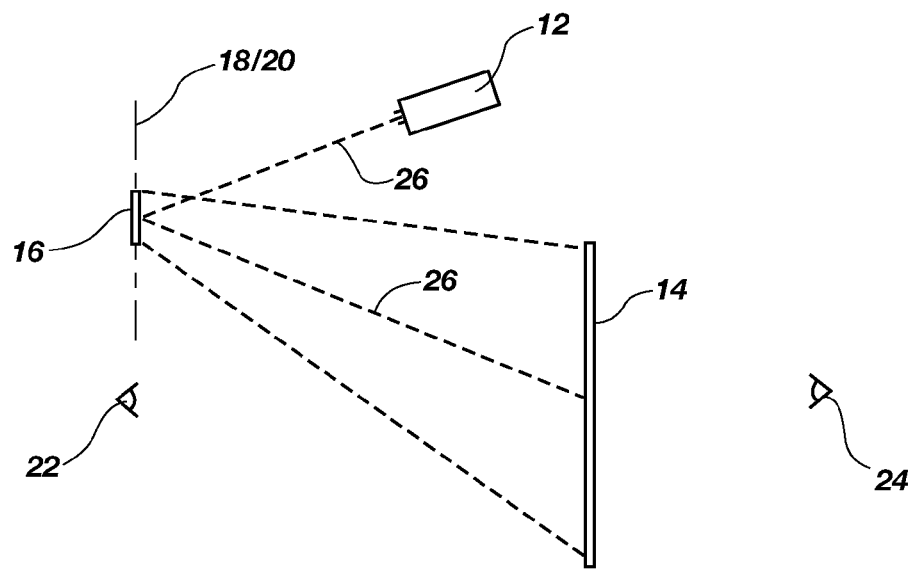
FIG. 4 is an elevational view of the scanning projection system of FIG. 3.

A panoramic real image display system 10 that the inventors have developed and which incorporates a GLV projector is shown in FIGS. 3 and 4. This system generally comprises a linear array GLV projector 12, a curved display screen 14, and a flat (i.e. substantially planar) scanning mirror 16 having a rotational axis 18 in the plane of the mirror. The curved display screen has an axis or center of curvature 20. The rotational axis is parallel to and preferably collinear with the axis of curvature.

The primary viewer location or eyepoint 22 is located below the scanning mirror 16 and approximately on the rotational axis/axis of curvature 18/20, viewing the concave side of the screen 14. However, the display screen could be a back projection screen, thus creating a secondary viewer location 24 viewing the convex side of the curved screen. While the screen shown in FIGS. 3 and 4 is curved about a single axis (i.e. the screen forming a portion of a cylinder), the system could also be used with a double-curved screen.

The GLV linear array projector 12 projects an image along a light path or optical axis 26 toward the scanning mirror 16, which reflects the image onto the screen 14. The optical axis is oblique to the rotational axis 18 of the scanning mirror. The projector is configured to produce the image by continuously scanning a vertical (rather than horizontal) line of pixels 28. The designation of "vertical" is relative to the orientation of the rotational axis 18 of the scanning mirror, which corresponds to the vertical dimension of the panoramic image. The projected line of pixels is parallel to the rotational axis of the scanning mirror. During each refresh cycle, the planar scanning mirror rotates through one half of a rotation, reflecting each scanned vertical line of the image onto the screen at its proper location to reproduce the total image. While the projection system shown in FIGS. 3 and 4 is a panoramic scanning system, it will be apparent that the use of laser scanning projectors is not limited to such systems.

One embodiment of a projector device 50 configured in accordance with the present invention is shown in FIG. 1. This projector device generally includes a laser light source 52, a spatial light modulator 54, an optical system 56, and a scanning device 58 that is configured to direct the scanned image to a display surface or screen 60. The laser light source can comprise solid-state lasers such as the type taught in U.S. patent application Ser. No. 10/017,162. Other types of laser light sources can also be used. The spatial light modulator is preferably a grating light valve (GLV) which is manipulated to produce a vertical line of pixels. This vertical line of pixels is scanned horizontally across a field of view on the screen at a refresh rate (e.g. 60 Hz) by the scanning device so as to produce a complete image.

The scanning device 58 is a light-steering device, and can be configured in various ways. In the projection systems shown in FIGS. 3 and 4, the scanning device is a rotating mirror. However, other types of scanning devices can also be used. For example, an oscillating mirror or galvanometer can be used in conjunction with the present invention. Alternatively, a micro-mirror device or an acousto-optic modulator can also be used. An acousto-optic modulator comprises a crystal that is driven by a variable ultrasonic frequency that changes the output angle of light from the crystal. There are many suitable devices that can be used to scan the line of pixels across the display screen 60 so as to produce the desired image.

Figure 2:
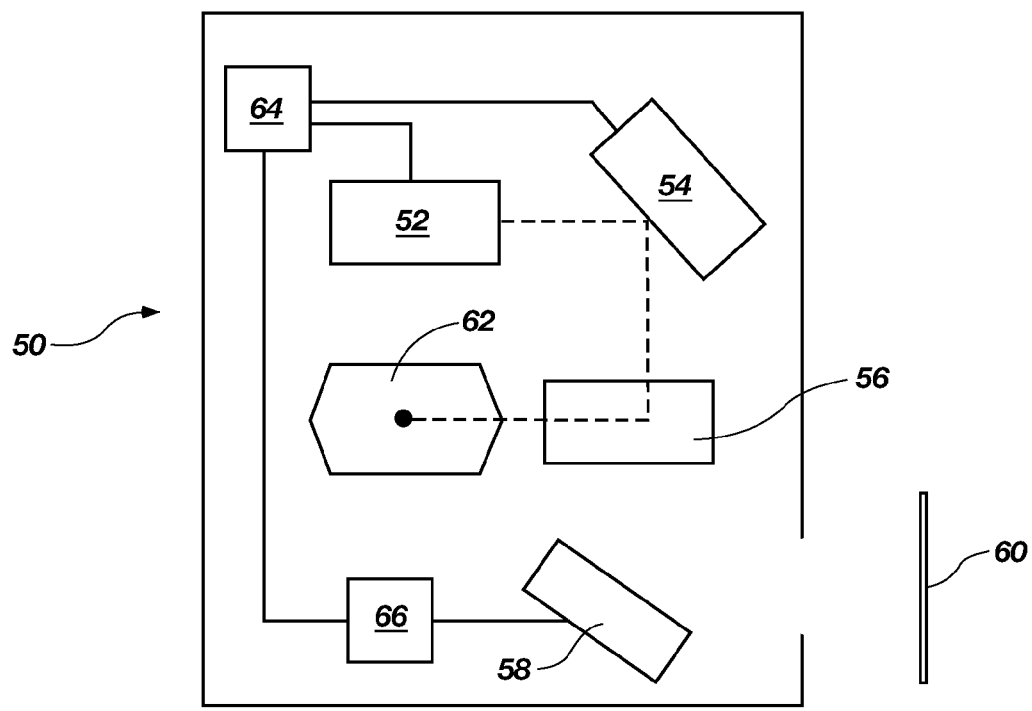
FIG. 2 is a schematic diagram of the scanning laser projection system of FIG. 1 in a condition of scan failure.

The optical system 56 includes a spatial filter, which is configured to pass to the scanning device 58 only light that has been diffracted. Thus, when the GLV is operating, light representing the desired image passes through the optical system to the scanning device, and is thence directed to the screen 60. However, when the GLV is turned off, as shown in FIG. 2, or to the extent that part of the GLV produces "off" pixels, the spatial filter causes the undiffracted light to be directed to a light dump 62. Light dumps are well known, and act to absorb light that is directed thereto.

The projector system 50 includes a controller 64 that is interconnected with the light source 52, the light modulator 54, and the scanning device 58 so as to provide a feedback system that coordinates the motion of the scanner with modulation of the GLV for producing and scanning the desired image. Advantageously, both the GLV and the scanning device are driven by the same source. Additionally, a scanner detection device 66 is associated with the scanner and interconnected to the controller. The scanner detection device continually receives feedback from the scanner, processes the information, and sends the results to the controller. The scanner detection device can include an encoder, which provides an encoder pulse that indicates whether the scanning device is operating properly (e.g. at the proper speed), and sends a corresponding signal to the controller. In the case where the scanning device comprises a rotating mirror, for example, the signal to the controller can indicate whether the mirror is continuing to rotate at the proper speed. The controller thus continually monitors the input from the scanner detection device and controls the light modulator accordingly. Thus, in the present invention, the image signal and the state or status of the scanning device are coupled together.

If the controller 64 detects a malfunction of the scanning device 58 (e.g. the scanning mirror has slowed or stopped), the light-shuttering function of the invention is enabled, as shown in FIG. 2. Specifically, because the projection system uses a GLV as the light modulator 54, light-shuttering is accomplished by cutting power to the light modulator, thus flattening the diffraction grating of the GLV. When the diffraction grating is flattened, all light passing to the optical system 56 is undiffracted, and is therefore automatically directed to the light dump 62, thus preventing it from leaving the projector. Because the light-shuttering device is also the light modulating element in the projection system, no additional components are needed in the optical path in order to shutter the light.

The system of the present invention provides many advantages. The electronic shutter is significantly faster than traditional mechanical methods. The inventors' experiments and calculations indicate that the system can detect a change in the status of the scanning device and shut off or flatten the GLV within a time of less than about 20 microseconds. This is significantly faster than many other shuttering systems. For example, mechanical shutter systems can take several milliseconds for actuation, thus raising the possibility of eye damage if the concentrated laser light happens to contact a person's eye. The invention thus acts as a fail-safe to prevent unwanted laser light out of the projector if the system were to fail or lose power.

The increased speed of the light shuttering system is sufficient to allow a reduction in the laser safety classification of the projection system. This allows the device to be simpler and less expensive than other similar devices, and avoids the need to comply with more onerous safety regulations and/or licensing requirements. The system also acts as a fail-safe in the event of power interruption.

By way of example, and without limitation, the invention can be described as a shuttering system for a scanning projector having a laser source, a grating light valve light modulator, and a light steering scanner. The shuttering system comprises a feedback system interconnecting the scanner with the light modulator, configured to deactivate the light modulator, so as to redirect laser light away from the scanner in case of scanner malfunction.

In accordance with a more detailed aspect of the invention, the shuttering system can be configured to detect scanner malfunction and deactivate the light valve in a time less than about 20 microseconds.

As another example, the invention can be described as a method for rapidly preventing escape of laser light from a scanning laser projection system having a grating light valve light modulator and a scanning device, comprising the steps of monitoring operation of the scanning device, and deactivating the light modulator upon detection of scanner malfunction.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

What is claimed is:

1. A shuttering system for a scanning projector having a laser light source, a light modulator, and a light steering scanner, the shuttering system comprising a feedback system, interconnecting the scanner with the light modulator, configured to detect a scanner malfunction and deactivate the light modulator, so as to redirect laser light away from the scanner, in case of the scanner malfunction, wherein the shuttering system is configured to detect the scanner malfunction and deactivate the light modulator in a time less than about 20 microseconds.

2. A shuttering system in accordance with claim 1, wherein the light modulator is a grating light valve (GLV).

3. A shuttering system in accordance with claim 1, wherein the light steering scanner is selected from the group consisting of a rotating mirror, a galvanometer, a micro-mirror device, and an acousto-optic modulator.

4. A shuttering system in accordance with claim 1, further comprising a spatial filter, configured to pass to the light steering scanner only light that has been diffracted by the light modulator, and to direct undiffracted light to a light dump.

5. A shuttering system in accordance with claim 4, wherein the light modulator is a grating light valve (GLV).

6. A shuttering system in accordance with claim 5, wherein the feedback system is configured to cut power to the GLV upon detection of malfunction, thus flattening the diffraction grating of the GLV, such that all light thence passing to the spatial filter is undiffracted.

7. A shuttering system in accordance with claim 1, wherein the feedback system further comprises a controller, interconnected with the light source, the light modulator, and the scanner, and configured to coordinate the operation of the scanner with modulation of the light modulator.

8. A shuttering system in accordance with claim 7, wherein the light modulator and the scanning device are driven by a common source.

9. A shuttering system in accordance with claim 7, further comprising a scanner detection device, associated with the scanner and interconnected to the controller, configured to continually receive feedback from the scanner and to detect malfunction of the scanner, to processes the feedback, and to send a corresponding signal to the controller.

10. A shuttering system in accordance with claim 9, wherein the scanner detection device includes an encoder, configured to provide an encoder pulse indicating whether the scanning device is operating properly, and to send a corresponding signal to the controller.

11. A scanning projector system, comprising:
    a) a laser light source, configured to project light along a light path;
    b) a light modulator, positioned along the light path, configured to modulate the laser light to produce an image;
    c) a light steering scanner, positioned along the light path; and
    d) a feedback system, interconnecting the scanner with the light modulator, configured to detect malfunction of the scanner and to deactivate the light modulator in a time of less than about 20 microseconds, so as to redirect laser light away from the scanner in case of a scanner malfunction.

12. A scanning projector system in accordance with claim 11, wherein the light modulator is a grating light valve.

13. A scanning projector system in accordance with claim 11, wherein the light steering scanner is selected from the group consisting of a rotating mirror, a galvanometer, a micro-mirror device, and an acousto-optic modulator.

14. A scanning projector system in accordance with claim 11, wherein the feedback system further comprises a controller, interconnected with the light source, the light modulator, and the scanner, and configured to coordinate the operation of the scanner with modulation of the light modulator.

15. A scanning projector system in accordance with claim 14, wherein the light modulator and the scanning device are driven by a common source.

16. A scanning projector system in accordance with claim 14, further comprising a scanner detection device, associated with the scanner and interconnected to the controller, configured to continually receive feedback from the scanner to detect malfunction of the scanner, to processes the feedback, and send a corresponding signal to the controller.

17. A scanning projector system in accordance with claim 16, wherein the speed detection device includes an encoder, configured to provide an encoder pulse indicating whether the scanning device is operating properly, and to send a corresponding signal to the controller.

18. A method for rapidly preventing escape of laser light from a scanning laser projection system having a grating light valve light modulator and a light steering scanning device, comprising the steps of:
    a) monitoring operation of the scanning device in response to projected laser light; and
    b) deactivating the grating light modulator upon detection of scanner malfunction, wherein detection of the scanner malfunction and deactivation of the grating light modulator occurs in a time of less than about 20 microseconds.

19. A shuttering system for a scanning projector having a laser light source, a light modulator, and a light steering scanner, the shuttering system comprising:

a feedback system, interconnecting the scanner with the light modulator, configured to detect a scanner malfunction and deactivate the light modulator, so as to redirect laser light away from the scanner, in case of the scanner malfunction;

wherein the feedback system further comprises a controller, interconnected with the light source, the light modulator, and the scanner, and configured to coordinate the operation of the scanner with modulation of the light modulator;

further comprising a scanner detection device, associated with the scanner and interconnected to the controller, configured to continually receive feedback from the scanner and to detect malfunction of the scanner, to processes the feedback, and to send a corresponding signal to the controller; and wherein the scanner detection device includes an encoder, configured to provide an encoder pulse indicating whether the scanning device is operating properly, and to send a corresponding signal to the controller.

* * * * *